Figures 1, 1A:
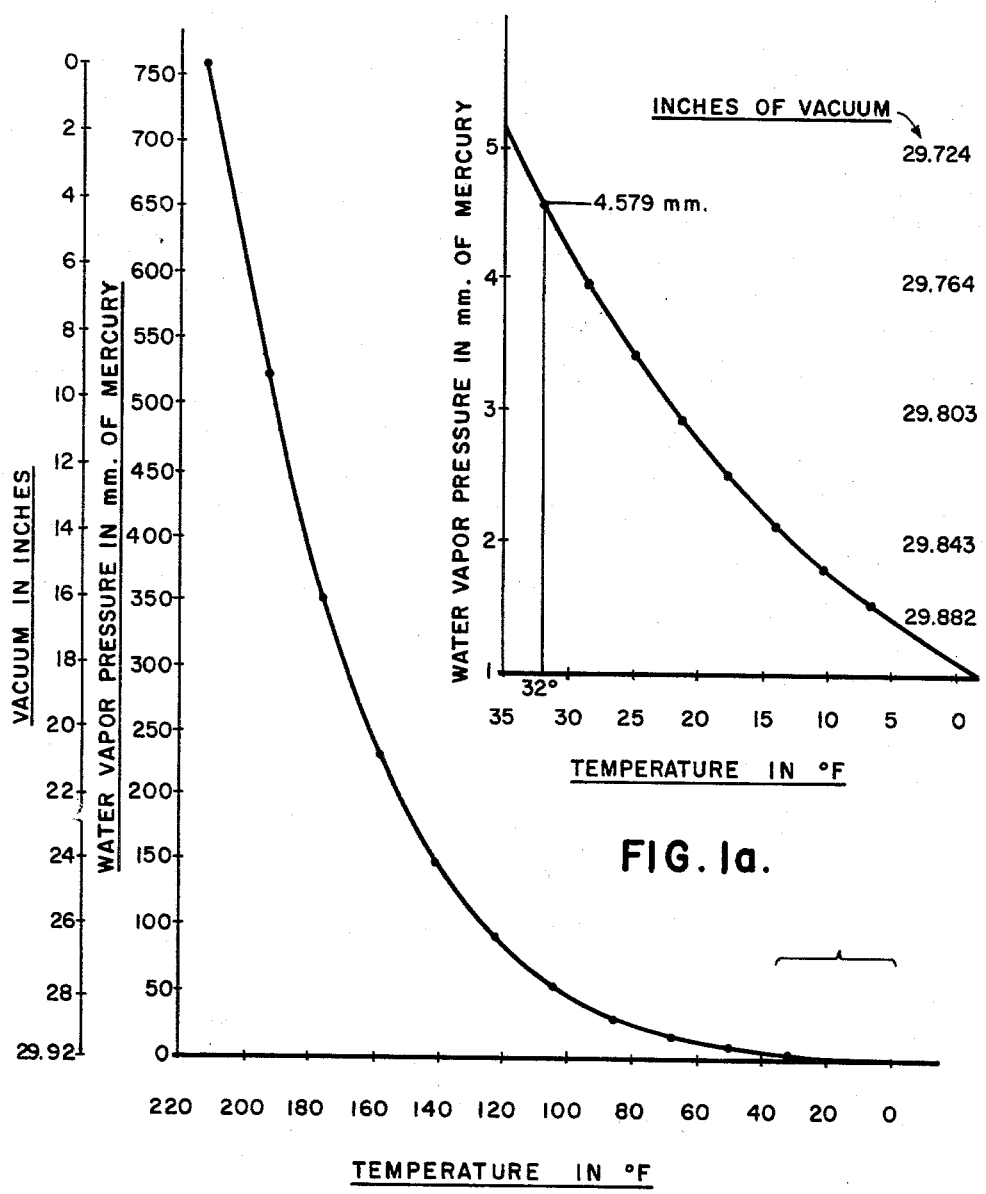

Nov. 23, 1965 F. G. LAMB 3,219,463
PROCESS OF DEHYDROFREEZING FOODS
Filed Feb. 9, 1962

INVENTOR
Frank G. Lamb

BY
ATTORNEYS

United States Patent Office 3,219,463
Patented Nov. 23, 1965

3,219,463
PROCESS OF DEHYDROFREEZING FOODS
Frank G. Lamb, American Falls, Idaho, assignor to Lamb-Weston, Inc., a corporation of Oregon
Filed Feb. 9, 1962, Ser. No. 172,332
11 Claims. (Cl. 99—204)

This application is a continuation-in-part of my copending application Serial No. 157,956, filed December 8, 1961.

This invention relates to ta process for the preservation of various types of materials, and is particularly directed to a freezing process involving vacuum predehydration of the material in a sequence of steps that includes freezing thereof as a final stage, either by vacuum or other known freezing methods.

Although the disclosure of this invention is primarily directed, as an exemplification, to food products the method of freezing is ideally suited to the freezing of almost any organic "living" material. As is well known experimentations have been conducted regarding the freezing of human tissues, for example, either as preparatory to microscopic and other examination thereof or as a means of preservation of same. All organic living materials, whether they be vegetable or animal, are comprised of cellular formations. If the material under treatment be human tissue and it is desired to freeze the same, then the principle herein referred to is applicable—that freezing thereof by the instant method assures preservation or substantial preservation of the original cellular formation of such organic material, so that upon thawing the cellular framework is retained.

In any event this invention, for purposes of explanation, is specifically disclosed with relation to the freezing of food products which of course, are organic materials having a definite cellular structure which the process of the invention is intended to preserve. In this regard the result of the process is a marked improvement in product texture after thawing over existing methods of freezing. This improvement in product texture is a result of the reduced cell rupture which in turn is due to the partial dehydration of the cell with the resulting room for expansion of the ice crystals within the cell when the product is frozen.

Dehydration of the cell is accomplished by subjecting the product to a reduced external pressure (vacuum) for a period of time. This reduced external pressure causes the greater internal pressure to "boil off" the water within the cell until the pressure within the cell is the same as the pressure outside the cell. At the same time, the product temperature is reduced to correspond to the boiling point of water at that pressure.

The product is not subjected to such a reduced pressure (vacuum) that portions of the product will freeze before all the cells within the product have reached the same temperature. Therefore the external pressure is not substantially reduced below 4.6 mm. of mercury. The boiling point of water at this pressure is approximately 32° F.

The involved procedure requires "holding" of the product at about 4.6 mm. pressure for sufficient time for all the cells within the product to "boil off" water and reach an equilibrium at 4.6 mm. of pressure. The water within the cell that is being boiled off will vaporize, pass through the cell wall and thence through the inter-cellular spaces to the atmosphere surrounding the product. The space within the cell that was occupied by the water that was "boiled off" is now available for the ice crystals to expand into as the product is subsequently frozen.

By thus providing expansion space for the ice crystals, substantially less (if any) rupturing or damage to the cell walls occurs by the ice crystals as they form and "grow" during freezing of the product. The product at this point can be frozen by conventional freezing methods or by subjecting it to greater vacuum (less pressure) so that the boiling point of the water in the product is below the freezing point of the water. The method of freezing may be of any type so long as these preliminary steps are taken. The above process is of particular value with respect to products the texture of which is impaired by the freezing process, particularly such products as berries and deciduous fruits.

The invention may thus be further defined as basically involving the following novel concept: that if a given amount of water is evaporated from a given product by vacuum, such vacuum reducing the temperature of said product to the freezing point (32° F. for water, and somewhat less than this for solutions found in some foodstuffs) or slightly above freezing, and then a suitable time period is allowed to lapse with imposition of such predetermined amount of vacuum as to maintain said temperature before freezing by lowering of the temperature to below 32° F., the remaining water in the product, upon freezing, will have space in which to expand without rupturing the cells of the product or without rupture or damage to the pectin lattice work outside the cells which hold the cells in place. Differently stated, the concept of this invention involves imposition of vacuum upon the product so as to obtain some appreciable dehydration of the product, or water removal from this product, at a temperature at or slightly above freezing, prior to actual freezing. This results, as stated, in the provision of the required space for the ice crystals formed when the temperature is lowered to limits substantially below the freezing point. Cell rupture and damage to the pectin lattice work extraneous of the individual cells, is thus precluded.

Much modern research has been directed toward improving the quality of frozen food. The constant aim has been to provide freezing procedures, of whatever type, which will, upon reconstitution of the given product, result in duplicating the taste, appearance and other inherent qualities of the product exhibited by the same when it is fresh. However, frozen foods as of today still exhibit a taste quality that in most instances cannot compare with the taste and other inherent qualities of the product when fresh. This is perhaps particularly true with respect to such foods as fruits, meats and sea foods, the latter type of product being extremely resistant to dehydration and freezing procedures which will result, upon reconstitution, in complete reinstatement of the taste quality.

As inferred in the foregoing, it is my view that cellular damage during known freezing procedures causes such failure or full reconstitution or is the fundamental cause of failure to regain the full taste and other desirable qualities of the product when fresh.

The instant invention is propounded as eliminating the many disadvantages inherent in freezing procedures heretofore known, since the process here provided for eliminates, or substantially eliminates, damage to the cellular structures of the product as well as obviates damage to the pectin lattice work of the product, during the freezing period.

Thus, although not all factors entering into the successful results which are accomplished by the instant invention are known, it is my theory, as implied above, that the inherent qualities of food products are destroyed by freezing procedures which inherently result in cell deterioration.

It is also believed that the reason almost any kind of food product, particularly fruits but also vegetables, meats, etc., have a tendency to "bleed" after thawing is not only because some or a substantial portion of the cells thereof have been damaged by the freezing process, but also because the pectin cross-linkage structure which holds the cells together has also been ruptured. In its normal state, the pectin cross-linkage structure holds water in between the cells, very probably as "bound" water, much as a silicate gel or calcium chloride attracts and holds water without chemical action. Consequently, when such lattice work of pectin is ruptured, the water is not "bound" and therefore bleeds.

It has been found that such cellular damage, and damage to the pectin lattice, can be prevented if the temperature of the product is first lowered by vacuum to the freeze point and maintained at the freeze point or just above the same, without freezing, for an appreciable period of time before final freezing by application of even lower pressure (or other means) to lower the temperature to well below freezing. The effect of this is, inter alia, to permit gradual withdrawal of some of the water deposited exteriorly to the individual cells, with the result that, with further lowering of temperature and freezing of the moisture within the cells, expansion thereof is permitted without cellular damage. Room for expansion of the ice in the pectin lattice work is also provided. The over-all effect is to retain the basic cellular structure of the product, and hence, upon thawing, retention of the cellular formation in its original state. Taste and quality are thus fully retained, or at least retained to an extent heretofore unobtainable.

Although all facets and underlying causes and effects of my procedure are not known, the theory of this invention is thought to follow this pattern: if the product is subjected to rapid freezing, say from room temperature through the freezing point to below freezing and in one continuous and rapid stage, the heat of the whole mass, including the heat inside the cell, is being used to evaporate moisture from between and outside the cells. It is considered that the heat will travel from inside a given cell through the cell wall by conduction much more rapidly than moisture will travel through the cell wall by osmotic action or water vapor through the cell wall by vapor pressure. Hence, if the moisture between the cells is removed to a much greater extent than the moisture from inside the cell, the result is to freeze the full moisture inside the cell before it can get out. That cell is consequently expanding by the rapidly lowered temperature at the same time that moisture is being withdrawn from the lattice work between the cells. The lattice work thus becomes weakened and hence susceptible to rupture.

Consequently, the novel concept of this invention: a delay of the entire dehydration by vacuum process at the freeze point level sufficiently long for the moisture inside the cell and the moisture outside such cell to equalize before freezing. The result is but a very small fraction of damage, if any at all, to cell walls, and as well, preservation of the pectin lattice work which supports the cellular mass. When freezing follows dehydration, it can then be accomplished without cellular damage by either lowering the pressure to a further degree (below 4.6 mm. of mercury), or by conventional freezing procedures.

In the foregoing, when reference is made to pectin lattice work, what is meant is the pectin cross-linkage srtucture in addition to the related lignin and cellulous molecules. Vegetables are different in their structure in certain respects from, for example, the cellular structure of meats. However, in all instances, and speaking of various types of food products, there is transmission through the cell wall membrane which, if by osmotic action, or other type of penetration, requires some time. The instant procedures provide for that requisite period of time with the end result of attaining a product which, when thawed, exhibits its original cellular form.

Viewed in the light of the foregoing explanation of the background of this invention, it is to be understood that a primary objective thereof is the provision of a process whereby a food product can be partially or substantially dehydrated and frozen in such manner that little or no damage is done to the cellular structure of the said product, whereby the product upon reconstitution, or thawing, is rehabilitated to its former state, here having reference to such natural qualities as taste, texture, appearance, etc.

It is a further object of the invention to provide a two-stage vacuum procedure for partial dehydration and reduction of the temperature of the product to the freeze point thereof or slightly above freezing, following which the product is maintained under an adjusted magnitude of vacuum to maintain such temperature and to remove a significant portion of contained moisture, this period of delay withdrawing sufficient moisture from the product to permit rapid freezing by, e.g., lowering of such vacuum to a greater degree, or freezing by conventional procedures, whereby the ice of crystallization is afforded room for expansion with consequent lack of damage to the cellular structure.

It is a further object of the invention to provide a freezing method which takes full account of the novel concept, heretofore unappreciated by the art, that cellular damage to a food product will occur by rapid lowering of temperature, through the freezing point, to extremely low temperatures below freezing, in one continuous stride. In this respect, damage is attributed to this effect of such quick freezing: rapid freezing, even by the vacuum method, causes freezing of the bound moisture of the pectin lattice work at approximately the same time the moisture within the individual cells freezes. The result is that such internal moisture has no room for expansion upon freezing and the cell walls are ruptured or other cellular damage takes place. The two-step procedure of this invention permits room for expansion during freezing; thus the elimination of cellular damage.

Other advantages and objectives of this invention will be apparent from consideration of the following, more detailed disclosure thereof.

It is visualized that if, for example, it is desired to freeze a given food product and to accomplish this equally throughout the mass of the product without cellular destruction, the preferred method must be by way of the described prevacuum treatment. In the course of such procedure, should for example, the product be subjected to a vacuum of about, e.g., 4.6 mm. of mercury, the contained water will boil at 32° F. plus but will not freeze.

However, once the product mass is cooled to the freeze point or slightly above, and in unfrozen condition, and the desired amount of moisture removed through subjection to vacuum of the order indicated, the product is now in an ideal situation for fast freezing by any of several methods. It may be preferred to lower the vacuum to a more extreme level as for example to one or one-half mm. This extremely low vacuum will rapidly freeze and evaporate more of the contained moisture as freezing takes place. This, however, does not eliminate the possibility of freezing, after reaching the 32° F. level by application of low temperature by other media. Air blast freezing may be mentioned as an alternate. In this instance such latter method works faster and better than where it is employed in known processes because the product has here been "precooled" to 32° F. Liquid nitrogen methods of freezing will also function ideally well for low temperature application after this initial vacuum step.

Regarding this predehydration phase, it will be understood that there is sufficient heat in the pulp of the product at room temperature to make possible achievement of the purpose of the invention. Although in the vacuum dehydration phase of the process, moisture removal in the order of 6% to 8% of the original moisture content of the involved product may be desirable for most foods, predehydration of even this rather low magnitude may not be necessary with respect to certain types of food products. Thus with regard to fruits, for example, as little as 3% removal of the original moisture content may suffice. This is because in this type of product the cell walls and pectin lattice work will withstand some strain without rupture consequent upon expansion of the remaining moisture when transformed into ice.

As an explanation of the preferred thinking of this invention, it will be understood that at an 80° F. pulp temperature of any given food product, there will be available 48 B.t.u.'s per pound of water of heat available. The latter figure represents the difference in degrees from 80° F. to 32° F., the freeze point. It will be further undrstood that at sea level about 970 B.t.u.'s are required to boil one pound of water. At more average elevations a few more B.t.u.'s are required, and assuming an arbitrary yet generally applicable figure, it is contemplated that 1050 B.t.u.'s may be considered the average heat required to boil one pound of water. Accordingly, if 48 B.t.u.'s per pound of water are available, with the application of 4.6 mm. of vacuum, about 4.6% (48 divided by 1050) of the original water content should be boiled off in the fashion indicated. The foregoing is applicable to any type of food product, it being considered that the percentages of water content in various foods will vary considerably.

However, the desidratum is the provision of the required expansion space for the ice formed when freezing does take place. It is known that water upon freezing expands about 1/11, or about .099, of its original volume. Hence, dehydration to the extent of about 10% of the original water content of the given food product will always insure adequate space for expansion, as none of the fluid content will exceed the expansion space which is required for water. In most instances, since the fluid content of the given product contains sugars, proteinaceous materials, etc., the required expansion space will be less than that 10% required by water. Accordingly: the concept of the invention that removal of moisture content of any given food product from about 3% to about 10% of the original moisture content, is sufficient.

Referring to the accompanying graph, it is seen that application of vacuum to a water solution in the amount of 4.579 mm. of mercury reduces the temperature of the water to the freeze point or 32° F. However, this freeze point with regard to different vegetables and fruits may vary within somewhat narrow limits, as from 29° F. to 32° F. due to the nature of the various fluids contained in the product (i.e., sugar solutions, etc.). Hence, depending upon the particular product encountered, the initial application of vacuum may involve vacuum of an order of from about 4.4 mm. to about 4.6 mm. In any event the precise amount of vacuum applied is not too critical in any one given case, so long as sufficient vacuum is applied to bring the temperature down to near the freeze point. If it is brought within a degree or two of same, such is adequate, the only difference being that if, for example, a given product has a freeze point of 29° F. and the temperature is brought down to 32° and not to 29°, the difference would only represent that many more B.t.u.'s available to boil off the additional, corresponding amount of water.

Hence, the invention requires the following sequence: The first step is the imposition of vacuum to a point which will lower the temperature of the given product to or just above the freeze point thereof, and with a corresponding amount of dehydration due to vacuum withdrawal. It is contemplated that in this first step the amount of vacuum will be from about 4.4 to 4.6 mm. of mercury pressure. It will be appreciated that water is evaporated from the product due to the greater water pressure in the product than in the medium surrounding the product. Further as such water is evaporated by the lowered pressure, heat is given up by the product and product temperature is reduced to the freezing point.

Secondly, the product is permitted to rest under vacuum of the stated order at the same temperature (i.e., at or slightly above the determined freeze point of the given product) for a period of time sufficient to dehydrate the product, depending upon its type, in an amount of about 3% to about 10% of the original moisture content of the product. The period of time will vary, depending upon the specific type of product being processed; however, it has been found that at the pressures indicated and with respect to most foodstuffs, the "rest" period will average from about 5 minutes to about 10 minutes, and will in no event exceed 30 minutes. Furthermore, subjection to vacuum of the stated order for periods somewhat longer than actually required will not have any deleterious effect: whenever interior and exterior of the cellular formations have reached equalized pressures, the situation becomes inert or stable.

Thirdly, subsequent to this waiting period during which portion of time a substantial amount of dehydration has taken place, i.e., from 3 to 10%, depending upon the nature of the product, the product is subjected to temperature reduction to a point well below freezing, i.e., from about 0° F. to −10° F. This can be accomplished by the same vacuum concept, and in this instance with the desire for immediate freezing, the vacuum can be lowered to a pressure of from about .5 mm. to 1 mm. Alternatively, in this phase of the process, and as mentioned above, other conventional methods of quick freezing may be employed to lower product temperature the amount required for immediate freezing.

As further explanatory of the theory underlying this invention, it is to be appreciated that most if not all foodstuffs are made up of a large percentage of water. In order to cool the given food product to a given temperature, it is thus necessary to lower the gas pressure surrounding the product to a predetermined vacuum level. The water in the foodstuff will then "boil" away until the product temperature is lowered to the corresponding vacuum pressure (refer to the accompanying chart). At from about 4.5 to about 4.6 mm. of vacuum pressure, the corresponding temperature (for water) is 32° F.

At this stated vacuum pressure, based upon the specific heat of the food product subjected to vacuum (and assuming adequate evaporable moisture in the product) a calculatable amount of moisture will be removed, thereby removing heat from the product until the temperature thereof reaches that temperature corresponding to the stated vacuum pressure. Most foodstuffs subjected to such vacuum (e.g., 4.6 mm. of mercury) at room temperature have sufficient specific heat to evaporate enough water to lose from 3 to 10% of the original moisture content thereof. This 3 to 10% of weight is lost from the surface in the intercellular space in the product, the removed moisture requiring adequate time to exit from inside the individual cells. The specific heat which is in the individual cell moves from the cell by conduction more rapidly than the water, liquid or vapor can go through the cell wall. Thus, by holding the vacuum pressure at, e.g., 4.6 mm. of mercury for preferably 5 to 10 minutes, the moisture within the individual cell will progress into the intercellular space until it reaches an equilibrium point. After this equilibrium point has been reached, the whole foodstuff is approximately equally dehydrated throughout its mass. The value of this procedure lies in these fundamental considerations:

Firstly, if a given foodstuff is not partially dehydrated before freezing, it is apparent that freezing of the moisture in the product will result in corresponding expansion because ice requires more space than water, or in this case, the particular solution or involved juice. This expansion of the ice in such a procedure will normally cause damage by rupture of the cellular structure of the product, due to lack of expansion space. In the instant invention, by evacuating that amount of water sufficient for expansion space prior to freezing, and by accomplishing evaporation uniformly throughout the product, room is provided for expansion due to freezing, and without cellular or intercellular damage.

Secondly, if a foodstuff be partially dehydrated, but dehydrated predominantly with respect to the intercellular spaces, as distinguished from dehydration within the cell, a situation may be created whereby freezing may cause more damage than if no dehydration at all had taken place. This is because if the intercellular space is evacuated or moisture evaporated therefrom, and freezing then takes place before the moisture from the cell can migrate to the intercellular space, the freezing of the cell can more easily rupture the cell walls because of the consequent voids between cells. Such explains why the delay in the range of from 5 to 30 minutes before final freezing is an essential and important concept of the instant invention.

The following calculations, directed to a specific food (fresh peas), more accurately demonstrate the mechanics of the initial predehydration step of the invention:

Specific heat of solids (here fresh peas)=0.25
Specific heat of water=1.00
Heat of vaporization=1050 B.t.u./lb.
Heat of fusion=144 B.t.u./lb.

100 lbs. product at 80% moisture (20 lbs. solids, 80 lbs. water) and at 92° F.; the freezing point of the product is 32° F.

Product temperature is lowered 60° F. (by vacuum) to such freezing point.

Pounds of water evaporated in cooling product 60° F. (92° to 32° F.)=

$$\frac{(\text{specific heat of solids}) \times (\text{°F. change in solids})}{(\text{heat of vaporization of water})} \times (\text{lbs. solids}) +$$

$$\frac{(\text{specific heat of water}) \times (\text{°F. change in water})}{(\text{heat of vaporization of water})} \times (\text{lbs. water in product}) =$$

$$\frac{(0.25 \text{ B.t.u./lb.}) \times (60° \text{ F.})}{1050 \text{ B.t.u./lb.}} \times (20 \text{ lbs.}) +$$

$$\frac{(1.0 \text{ B.t.u./lb.}) \times 60° \text{ F.})}{1050 \text{ B.t.u./lb.}} \times (80 \text{ lbs.}) =$$

$$0.29 \text{ lb.} + 4.57 \text{ lbs.} = 4.86 \text{ lbs.}$$

Lbs. water remaining in product=(80.00−4.86)= 75.14 lbs.

It is to be observed that in the specific calculations set forth in the foregoing, the moisture content of the particular product there involved (fresh peas) was 80%. However, food products of different types vary in the amount of included moisture, some approaching a moisture content somewhat in excess of 90%, others having a moisture content of about 70%. In any event, the over-all percentage of moisture removal or percentage of dehydration can be readily calculated by the foregoing irrespective of the initial moisture content of the food product being treated. Such calculations thus afford the operator a guide as to the balance of the involved variables to obtain, for example, the required amount of moisture removal for expansion space, the optimum amount of initial reduced pressure, the period of time of dehydration, etc. The product, during practice of this process, is also under constant observation by the operator, with readings being taken of internal temperatures, hence permitting the operator to subject the product to optimum conditions.

The following examples of the practice of the invention are illustrative only and not to be considered as confined to the precise food products herein referred to. In other words the processing is applicable without restriction to almost any type of food product, particularly those which have a porous exterior. Some foods, such as grapes and peas, must have their skins punctured for ready access to the interior thereof in order for the vacuum procedure to have its desired effect.

Example I

A quantity of fresh peas are slit and placed within a vessel able to withstand internal and external pressures of about 20 p.s.i. The vessel is constructed with a 100-pound capacity.

The vessel is pressure sealed and steam introduced until the peas reach a temperature of between 200 to 212°, and that temperature maintained for a period of about 5 minutes. Such steam treatment blanches the peas and also introduces an amount of heat beneficial in the next step, consisting of vacuum application.

The steam is turned off and a vacuum applied to the interior of the vessel in an amount of about 4.6 mm. mercury pressure. The charge is submitted to such vacuum for a period of about 8 minutes, the temperature being reduced during this period of time to about 33° F.

The vessel is kept at this pressure and the charge maintained at the stated temperature for a period of about 10 minutes. At the end of this time, the peas are dehydrated or moisture removed therefrom, in an amount of about 10% of the original moisture content. The purpose of the instant step in the procedure is not only to obtain sufficient dehydration but, as a result of such dehydration, to thereby provide sufficient space for the expansion of the residual water when it is frozen by the final quick freeze phase.

The pressure is then lowered a sufficient amount to rapidly and completely freeze the product and to reduce the temperature thereof to about 0° F. Such vacuum is in the order of 2 mm. of mercury and the required time to reach this lowered, and freezing temperature, about 5 minutes.

Example II

Twenty-five pounds of potatoes are peeled, washed, diced into quarter-inch cubes, and precooked in a conventional manner.

This product, at a temperature of about 200° F., is then placed in a vacuum chamber and pressure applied in the order of about 4.6 mm. of mercury. At this vacuum, the product is reduced, in about 5 minutes, to a temperature of 33° F. The product is then held at this vacuum for a period of about 10 minutes. The amount of moisture reduction, during this waiting period while under vacuum, is about 15% of the total moisture content.

After such waiting period at this vacuum, and maintaining in this manner the temperature of the charge at the stated, amount, the vacuum is adjusted to about .5 mm. of mercury, the result being to rapidly lower the temperature of the product to 5° F. in a period of about 5 minutes.

The frozen potatoes are then removed and placed in deep freeze storage.

Example III

Fifteen pounds of cleaned, stemmed and fresh strawberries are placed in a vacuum chamber. The strawberries are subjected to a vacuum pressure of 4.6 mm. mercury. This reduces the temperature of the strawberries to 33° F. in about 5 minutes. The charge is permitted to stand in this reduced pressure zone for a period of an additional 8 minutes. This results in removal of about 7% of the original moisture content.

After such period, during which a substantial portion of the moisture is removed from the product due to the imposition of vacuum, the pressure is lowered to about 2 mm. mercury. This will, in about 8 minutes, lower the temperature of the product to about 0° F., at which point it is solidly frozen.

The charge is then placed in permanent deep freeze storage.

Example IV

Fifteen pounds of clean green string beans are placed in a vacuum chamber of the capacity and type as described in Example I.

A vacuum is induced in said vessel, the pressure being lowered to 4.6 mm. mercury pressure. The product within the vacuum chamber is kept under such pressure for a period of 8 minutes. At the end of this time it will be found that about 7% of the original moisture content of such product has been removed.

At the end of this 8-minute period, the product will be found to have a temperature of 32.5° F. The product is removed from the vacuum chamber and quickly transferred to a conventional quick freezing zone having a temperature of −20° F. The product is permitted to remain in this zone until its internal temperature is approximately the same (−20° F.) then removed and placed in permanent cold storage.

After the product has been removed from cold storage for purposes of use, it is prepared for consumption by immersion in warm or boiling water for a period of time to totally thaw the same and raise the temperature to a point proper for table serving. The product will be found to exhibit all of the natural qualities, such as taste, appearance, crispness, etc., of the original green vegetable before treatment by the foregoing freeze process.

Almost any type of food product can be satisfactorily treated by means of the instant method. In accordance with the formulae set forth above, the amount of vacuum to be initially applied may vary somewhat with respect to different products; the time limit as to period of initial subjection to vacuum may vary also within a range of several minutes; the amount of vacuum in order to accomplish the desired moisture removal during the "waiting period" will also vary from product to product. At any rate, these variables in most instances will fall within the preferred ranges set forth herein. When the phrase in this description "at the freeze point" is used, what is meant is that the temperature is preferably as low as possible without substantial freezing or formation of ice within the product. The process is operable during this dehydration "rest" period if the temperature is slightly above freezing.

The order of vacuum in the predehydration phase will, as indicated, and for most efficient performance of the process, vary only between about 4.4 mm. and 4.6 mm. of mercury pressure, it being noted that the lower limit of 4.4 would be utilized only with respect to solutions having a freeze point below that of water. The vacuum to be applied for final freezing after the "wait period" is preferably of the order of from .5 to 2 mm. of mercury pressure. It is of course obvious that lowering the vacuum below 4.4 will in any event and again having reference to the accompanying chart cause lowering of temperature below the freeze point. For practical purposes, however, the more reduced pressure (2 mm.) above indicated is preferable in order to reduce the period of time required for the final freeze stage.

With an undestanding of the basic principles involved in the instant invention, and having particular reference to the accompanying, and self-explanatory chart, as well as the specific examples set forth herein, those skilled in the art can readily determine the optimum conditions or variables and the optimum or preferred ranges of same that will lead to the desired functions and results of this invention.

The main and novel feature thereof emanates from the complete appreciation of the cellular damage that can be done, during a freezing procedure, to any type of food product if the conditions are not so controlled and regulated as to prevent rupture of the cellular structure of the product. By practice of this invention, damage thereto is substantially, if not completely precluded, for the novel concept is here recognized that expansion of the ice crystals will cause such damage unless controlled, and unless provision is consequently made for space for expansion of such ice crystals during the final freezing step.

As indicated in the foregoing the instant invention is described with particular reference to the treatment of food products although the invention is not to be understood as limited thereto. Thus, the method obtains advantageous results with respect to the freezing of other organic materials, such as animal tissues. As with vegetables or fruits, by preservation of the cellular framework thereof such animal organic substances are not "killed" by freezing for the original cellular organization has been retained. Hence, the invention is adaptable for use in the medical field where such cellular framework of human organic tissue, for example, is preserved by use of this freeze technique. More efficient preservation is thus assured.

The invention is not to be considered limited in scope in any way except as same as limited by the scope of the appended claims.

I claim:

1. A process for the freezing of fruits and vegetables and organic animal materials comprising: placing said materials in a vacuum zone, inducing a vacuum in said zone of a pressure sufficient to precool said materials to a temperature just above the freezing point thereof, maintaining said vacuum in said zone for a period of time sufficient to dehydrate said materials to the extent of from about 3% to about 15% removal of the original moisture content thereof and to permit the moisture content exteriorly of the cells and that interiorly thereof to reach approximate equilibrium, and promptly lowering the temperature of said materials to below said freeze point whereby said materials become frozen without cellular damage thereto.

2. A process for freezing fruits, vegetables and organic animal materials comprising: placing said material in a vacuum zone, reducing the pressure in said zone to about 4.6 mm. of mercury to precool said material to near its freeze point, maintaining the temperature at near said freeze point in said zone for a period of from about 5 minutes to about 30 minutes to dehydrate said material to the extent of from about 3% to about 15% removal of the original moisture content thereof, and lowering the temperature of said material to below said freeze point by reducing said pressure to from about one-half mm. of mercury to about 4 mm. of mercury, whereby said material becomes frozen without cellular damage thereto.

3. The process as defined in claim 1 wherein said step of lowering the temperature of said materials to below said freeze point is accomplished by reducing the pressure in said zone to below about 4.6 mm. of mercury for a period of from 5 to 10 minutes.

4. A process for the predehydration and freezing of fruits, vegetables and animal organic material, said predehydration being in an amount of from about 3% to about 10% of the original moisture content of said material, said process comprising the steps of: subjecting said material to a reduced pressure of about 4.5 mm. of mercury, in a vacuum zone to maintain said material at just above the freeze point and for a period of time sufficient to remove from about 3% to about 10% of the original moisture content of said material and to permit the moisture content exteriorly of the cells and that interiorly thereof to reach approximate equilibrium and freezing said material by promptly transferring said material to a freezing zone, said freezing zone having a temperature below 0° F.

5. A process for freezing fruits, vegetables and organic cellular animal materials comprising: placing said materials in a vacuum zone, and lowering the pressure therein to a point equivalent to the vapor pressure of said materials at the freeze point thereof, maintaining said vacuum in said zone for a period of from about 5 minutes to about 30 minutes to dehydrate said materials to the extent of removing from about 3% to about 15% of the original moisture content of said materials, and lowering the temperature of said materials to below said freeze point by decreasing said pressure to below about 4.6 mm. of mercury, whereby said materials are initially dehydrated to an extent to permit freezing thereof without cellular damage thereto consequent upon ice expansion, and are frozen by said decrease in pressure of below about 4.6 mm. of mercury.

6. The process as defined in claim 5 wherein said initial vacuum is between 4.4 and 4.6 mm. of mercury and the decrease in pressure in said last named step is down to from about .5 mm. to about 2 mm. of mercury.

7. In a process for freezing fruits, vegetables and cellular, organic animal materials, the steps of:
  (a) predehydrating said materials by subjection thereof to a vacuum of the order of from 4.4 to 4.6 mm. of mercury, whereby the temperature of said materials is reduced to just above the freeze point thereof;
  (b) maintaining said vacuum subjection of step (a) for a period of time sufficient to remove from about 3% to about 10% of the original moisture content of said materials and to permit the moisture content exteriorly of the cells and that interiorly thereof to reach approximate equilibrium while maintaining said temperature at just above said freeze point, and
  (c) lowering said temperature to substantially below said freeze point to freeze said materials, whereby said freezing is accomplished without damage to the cellular structure of said materials.

8. The process as defined in claim 7 wherein the amount of vacuum of step (a) is equivalent to the vapor pressure of said materials at the freezing point thereof.

9. The process as defined in claim 7 wherein the lowering of the temperature in step (c) is obtained by lowering the said vacuum to from between .5 to 2 mm. of mercury pressure.

10. The process as defined in claim 5 wherein the initial pressure in said zone is from about 4.4 to 4.6 mm. of mercury pressure.

11. The process as defined in claim 10 wherein the pressure of said last named step is from .5 to 2 mm. of mercury pressure.

References Cited by the Examiner
UNITED STATES PATENTS 2,930,139   3/1960   Brynko et al. _____ 99—204

OTHER REFERENCES

Food Industries: vol. 18, pp. 674 to 676 (Reprint, Copyrighted 1946 by McGraw-Hill, New York) 99–199.

A. LOUIS MONACELL, *Examiner.*

ABRAHAM H. WINKELSTEIN, ROSCOE S. AULL,
*Assistant Examiners.*